US010435606B2

(12) United States Patent
Rolland et al.

(10) Patent No.: US 10,435,606 B2
(45) Date of Patent: Oct. 8, 2019

(54) CABLES MADE OF PHASE CHANGE MATERIAL

(71) Applicant: E. I. DU PONT DE NEMOURS AND COMPANY, Wilmington, DE (US)

(72) Inventors: Loic Pierre Rolland, Divonne les Bains (FR); Jacques Andre, Vetraz Monthoux (FR); Jacques Roulin, Vesenaz (CH)

(73) Assignee: Performance Materials NA, INC., Midland, MI (US)

( * ) Notice: Subject to any disclaimer, the term of this patent is extended or adjusted under 35 U.S.C. 154(b) by 271 days.

(21) Appl. No.: 15/307,140

(22) PCT Filed: Apr. 28, 2015

(86) PCT No.: PCT/US2015/027950
§ 371 (c)(1),
(2) Date: Oct. 27, 2016

(87) PCT Pub. No.: WO2015/168096
PCT Pub. Date: Nov. 5, 2015

(65) Prior Publication Data
US 2017/0045301 A1    Feb. 16, 2017

Related U.S. Application Data

(60) Provisional application No. 61/987,761, filed on May 2, 2014.

(51) Int. Cl.
| C09K 5/06 | (2006.01) |
| D07B 1/16 | (2006.01) |
| F28D 20/02 | (2006.01) |
| D07B 1/00 | (2006.01) |
| H01B 3/44 | (2006.01) |

(52) U.S. Cl.
CPC ............ C09K 5/063 (2013.01); D07B 1/00 (2013.01); D07B 1/162 (2013.01); F28D 20/02 (2013.01); H01B 3/448 (2013.01); D07B 2201/2087 (2013.01); D07B 2201/2088 (2013.01); D07B 2201/2092 (2013.01); D07B 2205/2071 (2013.01); D07B 2401/2035 (2013.01)

(58) Field of Classification Search
None
See application file for complete search history.

(56) References Cited

U.S. PATENT DOCUMENTS

| 3,404,134 A | 10/1968 | Rees |
| 4,003,426 A | 1/1977 | Best et al. |
| 4,528,328 A | 7/1985 | Ranade et al. |
| 4,871,615 A * | 10/1989 | Vigo ........................ D01F 1/00 428/398 |
| 4,908,166 A * | 3/1990 | Salyer ...................... C08K 5/01 252/70 |
| 5,028,674 A | 7/1991 | Hatch et al. |
| 5,053,446 A | 10/1991 | Salyer |
| 5,191,004 A | 3/1993 | Maringer et al. |
| 5,366,801 A * | 11/1994 | Bryant ................. D06N 3/0059 428/305.5 |
| 5,520,223 A * | 5/1996 | Iorio ..................... B29C 63/486 138/137 |
| 5,722,482 A * | 3/1998 | Buckley .................... A61F 7/02 165/10 |
| 6,063,496 A * | 5/2000 | Jozokos .................. C08L 77/00 174/110 N |
| 6,500,888 B2 | 12/2002 | Baumgartner et al. |
| 6,518,365 B1 | 2/2003 | Powell et al. |
| 7,641,965 B1 | 1/2010 | Bennison et al. |
| 2002/0086204 A1* | 7/2002 | Rock .................. A41D 13/0051 429/120 |
| 2005/0155336 A1* | 7/2005 | Robins ..................... D02G 3/38 57/210 |
| 2006/0124892 A1 | 6/2006 | Rolland et al. |
| 2009/0242271 A1* | 10/2009 | Vetrovec .................. H01B 1/02 174/70 R |
| 2011/0024433 A1* | 2/2011 | Rolland ..................... B32B 1/02 220/592.2 |
| 2014/0206249 A1* | 7/2014 | Pearce ................. D06M 15/693 442/59 |

FOREIGN PATENT DOCUMENTS

| EP | 0747431 A2 | 12/1996 |
| WO | 98/04644 A1 | 2/1998 |
| WO | 2004/044345 A2 | 5/2004 |
| WO | 2006/062610 A2 | 6/2006 |
| WO | 2011/014636 A1 | 2/2011 |
| WO | 2011/143278 A1 | 11/2011 |

OTHER PUBLICATIONS

PCT International Search Report and Written Opinion for International Application No. PCTUS2015/027950 dated Jun. 24, 2015.

* cited by examiner

Primary Examiner — Jennifer A Steele

(57) ABSTRACT

Disclosed is a cable comprising a core and a PCM layer surrounding the core wherein the PCM layer consists of a PCM composition wherein the PCM composition comprises a PCM and an ethylene copolymer; and the core consists of a yarn, strand, or wire each made of a natural or synthetic polymeric material or a metal. The invention is useful for thermal management in a variety of applications in such as, for example, automotive, building, packaging, garments, and footwear.

11 Claims, No Drawings

CABLES MADE OF PHASE CHANGE MATERIAL

RELATED APPLICATION

This application claims priority under 35 U.S.C. § 119(e) from U.S. provisional application No. 61/987,176 filed May 1, 2014, which is incorporated by reference herein in its entirety.

BACKGROUND OF THE INVENTION

The present invention relates to the field of phase change material (PCM) for thermal management in different applications like for example automotive, building, packaging, garments and footwear. In particular, the present invention relates to cables comprising a phase change material, the process of making thereof and their use in applications such as automotive.

Phase change materials (PCM) are latent thermal storage materials that are capable of absorbing and releasing high amounts of latent heat during melting and crystallization, respectively. The thermal energy transfer occurs when a material is transformed from a solid to a liquid phase or from a liquid to a solid phase. During such phase changes, the temperature of the PCM material remains nearly constant as does the space surrounding the PCM material, the heat flowing through the PCM being "entrapped" within the PCM itself Among other well-known PCM, paraffin is frequently used as PCM because of its low cost and low toxicity.

PCM can be introduced in matrices made of different materials or applied to a coating. See, e.g., U. S. Pat. Nos. 4,003,426, 4,528,328, 5,053,446, US2006/0124892 (WO2006/062610), WO98/04644, and WO2004/044345.

In order to conveniently use the PCM in thermal management applications, the PCM have been so far incorporated into matrix polymers that absorb and retain the phase change materials, even at temperatures above the melting point of the PCM, thus making it possible to manufacture the resulting PCM composite materials into slabs, panels or other shapes that are easily mounted in a wall. However, most matrix polymers suffer from multiple drawbacks such as limited PCM absorption capacity, and substantial loss of PCM by exudation during lifetime. A partial solution to the above problems has been proposed in WO2006/062610, WO2011/143278 and WO2011/014636.

However, there is still a need for PCM containing materials that provides high heat storage capacity, high surface contact for optimum thermal exchange, that may be resistant to temperatures from −20° C. to 130° C. under permanent exposure to air but also to chemicals, in particular to lubricating oil and/or to ethylene glycol, that may remain efficient with time and that may provide high thermal conductivity.

SUMMARY OF THE INVENTION

This aim has been achieved with a cable described herein wherein the cable can comprise a core and a PCM layer surrounding the core wherein the PCM layer consists of a PCM composition wherein
 a) the PCM composition comprises a PCM and an ethylene copolymer; and
 b) the core consists of a yarn, strand or wire made of a natural or synthetic polymeric material or a metal.

Preferably, the amount of ethylene copolymer in the PCM composition can be lower or equal to 30 weight percent based on the total weight of the PCM composition.

In a preferred embodiment, the ethylene copolymer is ethylene vinyl acetate (EVA).

Preferably, the yarn, strand or wire in the cables of the present invention is made of polyparaphenylene terephtalamide (para-aramid).

In another embodiment, the cables of the present invention further comprise one or more layer(s) of a protective polymer. Preferably the cables of the present invention comprise one layer of a protective polymer. Preferably, the protective polymer is made of a blend of ionomer and polyamide. Even more preferably, the cables of the present invention comprise two layers of a protective polymer. Preferably, the first layer of protective polymer is made of a blend of ionomer and polyamide and the second layer is made of a polymer selected from the group consisting of grafted or non-grafted polypropylene homopolymer, grafted or non-grafted polypropylene copolymer, perfluoro ethylene-propylene (FEP), perfluoroalkoxy alkane (PFA), ethylene tetrafluoroethylene (ETFE), ethylene acrylate rubber (AEM), and combinations of two or more thereof Preferably, each layer of protective polymer may have a thickness of between 50 to 300 μm. More preferably, when two layers are present, the thickness is between 50 to 600 μm.

Preferably, in the cables of the present invention, the amount of PCM is at least 70 weight percent based on the total weight of the cable.

Preferred cables of the present invention have a diameter of 3 to 6 mm.

Also disclosed herein is a process for making the cables of the present invention wherein the process comprises the steps of:
 a) providing a core consisting of yarn, strand or wire made of a natural or synthetic polymeric material or a metal and
 b) extruding a PCM composition onto the core.

Optionally, the process further comprises a step c) wherein one or more layer(s) of one or more protective polymers are extruded onto the PCM composition and the core. Preferably two layers of protective polymer are extruded onto the PCM composition and the core. More preferably, the first layer is made of a blend of ionomer and polyamide and the second layer is made a polymer selected from the group consisting of grafted or non-grafted polypropylene homopolymer, grafted or non-grafted polypropylene copolymer, perfluoro ethylene-propylene (FEP), perfluoroalkoxy alkane (PFA), ethylene tetrafluoroethylene (ETFE), ethylene acrylate rubber (AEM), and combinations of two or more thereof Also disclosed herein is the use of the cables of the present invention in thermal management, in particular in automotive.

DETAILED DESCRIPTION

Definitions

As used herein, the term "a" refers to one as well as to at least one and is not an article that necessarily limits its referent noun to the singular.

As used herein, the terms "about" and "at or about" are intended to mean that the amount or value in question may be the value designated or some other value about the same. The phrase is intended to convey that similar values promote equivalent results or effects according to the invention.

As used herein, the term "acrylate" means an ester of acrylic acid with an alkyl group. Preferred in the invention are acrylates with alkyl groups having 1 to 4 carbon atoms.

As used herein, the term, the term "(meth)acrylic acid" refers to methacrylic acid and/or acrylic acid, inclusively. Likewise, the term "(meth)acrylate" means methacrylate and/or acrylate and "poly(meth)acrylate" means polymers derived from the polymerization of either or a mixture of both corresponding type of monomers.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene and 18 weight percent of acrylic acid", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such. The term "copolymer" may refer to polymers that consist essentially of copolymerized units of two different monomers (a dipolymer), or that consist essentially of more than two different monomers (a terpolymer consisting essentially of three different comonomers, a tetrapolymer consisting essentially of four different comonomers, etc.).

The term "acid copolymer" refers to a polymer comprising copolymerized units of an α-olefin, an α,β-ethylenically unsaturated carboxylic acid, and optionally other suitable comonomer(s), such as an α,β-ethylenically unsaturated carboxylic acid ester.

The term "ionomer" refers to a polymer that is produced by partially or fully neutralizing an acid copolymer as described above.

The cable of the present invention can comprise a core and a PCM layer surrounding the core. The PCM layer can consist of a PCM composition.

The PCM composition of the present invention can comprise a PCM and an ethylene copolymer.

The PCM is chosen among one or more alkyl hydrocarbons (paraffin waxes) or among fatty acids, fatty acid esters, salts of fatty acids, and/or combinations of two or more thereof Paraffin waxes are saturated hydrocarbon mixtures and generally consist of a mixture of mostly straight-chain n-alkanes with the chemical formula $CH_3-(CH_2)_n-CH_3$. The crystallization of the $-(CH_2)_n$-chain releases a large amount of the latent heat. Both the melting point and the heat of fusion increase with increasing chain length. Therefore, it is possible to select the paraffin waxes, which are products of petroleum refining, in such a way that the phase change temperature range matches with the temperature of the operation system to which the PCM is applied.

The fatty acids, fatty acid esters, salts of fatty acids can have an origin derived from animal fat, animal grease, vegetable oil, vegetable wax, and/or combinations of two or more thereof.

The fatty acids can be "long" chain fatty acids, both saturated and unsaturated, having tails of more than 12 carbons. Examples of such fatty acids include oleic acid, palmitic acid, linoleic acid, palmitoleic acid, stearic acid, or combinations of two or more thereof Frequently available fatty acids can be oleic acid, palmitic acid, linoleic acid, palmitoleic acid, stearic acid and/or combinations of two or more thereof.

The fatty acid esters can be formed with alcohols, diols, and/or polyols, including, but not limited to, mono-, di- or triglycerides of glycerol, esters of pentaerythritol, polyesters of polyhydric alcohols, esters of methanol, ethanol, propanol, butanol, isobutanol, pentanol, hexanol, cyclohexanol, esters or diesters of ethylene glycol and/or combinations of two or more thereof. Preferably, the fatty acid esters are mono-, di- or triglycerides of glycerol, and/or combinations thereof The ethylene copolymer of the PCM composition of the present invention comprises or is produced from repeat units derived from ethylene and at least one comonomer which can be vinyl acetate, acrylic acid, methacrylic acid, acrylic acid ester, methacrylic acid ester, carbon monoxide, octene, hexene, butene, 4 methyl-pentene-1, propylene, or combinations of two or more thereof such as vinyl acetate, alkyl acrylates, alkyl methacrylates, carbon monoxide, and/or combinations of two or more thereof.

Preferably, the comonomer is vinyl acetate, butyl acrylate, ethyl acrylate, methyl acrylate, and/or combinations of two or more thereof Most preferably, the at least one polar comonomer is vinyl acetate.

The ethylene copolymer can be a copolymer of ethylene and at least about 28%, at least about 35%, or at least about 40%, comonomer by weight, based on the weight of the ethylene copolymer.

Examples of ethylene copolymers include, but are not limited to, ethylene vinyl acetate copolymer (EVA), ethylene/(meth)acrylate copolymers, ethylene/alkyl (meth)acrylate copolymers, ethylene/(meth)acrylic acid copolymers, ethylene/alkyl (meth)acrylic acid copolymers, ethylene/vinyl acetate/carbon monoxyde copolymers, ethylene/butyl acrylate/ carbon monoxyde copolymers, ethylene/acrylic ester/ carbon monoxyde copolymers, ethylene-propylene copolymers, linear low density polyethylenes (LLDPE's), very low density polyethylenes (VLDPE's) and/or combinations of two or more thereof.

EVA includes copolymers derived from the copolymerization of ethylene and vinyl acetate or the copolymerization of ethylene, vinyl acetate, and an additional comonomer. An EVA may have a melt flow rate, measured in accordance with ASTM D-1238, of from 0.1 to 60 g/10 or 0.3 to 30 g/10 minutes. A mixture of two or more different EVAs may be used. Most preferably, the ethylene copolymer is ethylene vinyl acetate (EVA). Even most preferably, the ethylene copolymer is ethylene vinyl acetate comprising at least about 40% of vinyl acetate.

The blend of PCM and ethylene copolymer can be produced by any means known to one skilled in the art. For example, when the PCM has a melting point below room temperature (i.e. below 20 to 25° C.) a blend of PCM and ethylene copolymer can be produced by soaking different component(s) all together at temperatures which are slightly above the melting point of the PCM but below the melting point of the ethylene copolymer.

Soaking is a natural absorption of the molten PCM by the ethylene copolymer. The components can be mixed together in a tumble blender during a certain period of time which can vary in function of the rotational speed of the tumble blender itself for a sufficient period of time such as 1 to 10 hours or about 8 hours.

The blend of a low melting point PCM and ethylene copolymer can also be produced by melt blend extrusion whereby the components are blended at temperatures above the melting point of both the ethylene copolymer and the PCM, the thus obtained mixture being subsequently extruded into granules or directly into sheets or any other suitable form.

When the PCM has a melting point above room temperature (i.e. above 20 to 25° C.) a blend of PCM and ethylene copolymer can be produced by dry blending granulates of PCM and granulates of ethylene copolymer (both being solid at room temperature).

The composition may additionally comprise from 0.01 to 15, 0.01 to 10, or 0.01 to 5, weight percent, based on the total weight of the PCM composition, of additives including plasticizers, stabilizers including viscosity stabilizers and hydrolytic stabilizers, primary and secondary antioxidants, ultraviolet ray absorbers, anti-static agents, dyes, pigments or other coloring agents, inorganic fillers, fire- retardants, lubricants, reinforcing agents such as glass fiber and flakes, synthetic (for example, aramid) fiber or pulp, foaming or blowing agents, processing aids, slip additives, antiblock agents such as silica or talc, release agents, tackifying resins, or combinations of two or more thereof These additives are described in the Kirk Othmer Encyclopedia of Chemical Technology.

The additives may be incorporated into the composition by any known process such as by dry blending, extruding a mixture of the various constituents, the conventional masterbatch technique, or the like.

The amount of ethylene copolymer in the PCM composition is preferably lower or equal to 30 weight percent, more preferably lower or equal to 10 weight percent, based on the total weight of the PCM composition.

The invention in particular relates to cables comprising a PCM layer surrounding a core and optionally one or more polymer layer(s) surrounding the PCM layer and core.

The cable can be made by extruding the PCM composition onto a yarn, strand or wire made of a natural or synthetic polymeric material or a metal such as cotton, polyester, polyamide or polyphenylene terephtalamide (aramid) and/or mixtures or blends thereof Preferably the yarn, strand or wire is made of polyparaphenylene terephtalamide (para-aramid). Some suitable polyparaphenylene terephtalamide (para-aramid) yarns, strands or wires are commercially available from E. I. du Pont de Nemours and Company of Wilmington, Del. ("DuPont"), under the trademarks KEVLAR®.

The use of the yarn, strand or wire allows proper pulling of the overall cable during extrusion process of the PCM composition.

Typically, the PCM composition is fed into a wire coating extrusion line and is extruded at a temperature above its melting point, at the desired thickness, onto a yarn, strand or wire.

Optionally, one or more polymeric layer(s) can be extruded onto the cable obtained by extruding the PCM composition onto the yarn, strand or wire.

When manufacturing cables comprising PCM, the amount of PCM in the cables is desirably as high as possible, because the thermal performance of the compositions may be directly proportional to the concentration of PCM contained in the composition. The amount of PCM in the cables of the present invention is at least 70 weight percent, about 70 to about 95 weight percent or about 80 to about 90 weight percent, based on the total weight of the cable.

Optionally, the cables comprising a core and a PCM layer made of a PCM composition can further comprise one or more layer(s) of a protective polymer.

The layer(s) of protective polymer(s) of the present invention are intended to provide some properties to the cables such as heat resistance, chemical resistance, sealability etc. The protective polymer consists of any polymer but preferably, the protective polymer is an ionomer, a polyamide, a grafted or non-grafted polypropylene homopolymer, a grafted or non-grafted polypropylene copolymer, a perfluoro ethylene-propylene (FEP), a perfluoroalkoxy alkane (PFA), an ethylene tetrafluoroethylene (ETFE), an ethylene methylacrylate copolymer with a methyl acrylate content above 50 weight percent or mixtures or blends thereof.

In one embodiment, a layer of protective polymer can be made of a blend of an ionomer and a polyamide.

In particular, the layer can be made of a blend of an ionomer of an ethylene acid copolymer and a polyamide.

The ionomer can be a polymer that is produced by partially or fully neutralizing an acid copolymer as described below Suitable ethylene acid copolymers and ionomers are described in U.S. Pat. No. 7,641,965, issued to Bennison et al., for example. Briefly, however, the ethylene acid copolymer can comprise copolymerized units of an $\alpha$-olefin having from 2 to 10 carbon atoms and about 8 to about 30 weight percent, preferably about 15 to about 30 weight percent, more preferably about 20 to about 30 weight percent, yet more preferably about 20 to about 25 weight percent, or still more preferably about 21 to about 23 weight percent of copolymerized units of an $\alpha,\beta$-ethylenically unsaturated carboxylic acid having 3 to 8 carbon atoms. The weight percentage is based on the total weight of the ethylene acid copolymer. Preferably, the $\alpha$-olefin comprises ethylene; more preferably, the $\alpha$-olefin consists essentially of ethylene. Also preferably, the $\alpha,\beta$-ethylenically unsaturated carboxylic acid comprises acrylic acid, methacrylic acid, or a combination of acrylic acid and methacrylic acid. More preferably, the $\alpha,\beta$-ethylenically unsaturated carboxylic acid consists essentially of acrylic acid, methacrylic acid, or a combination of acrylic acid and methacrylic acid.

The ethylene acid copolymers may further comprise copolymerized units of other comonomer(s), such as unsaturated carboxylic acids having 2 to 10, or preferably 3 to 8 carbon atoms or derivatives thereof Suitable acid derivatives include acid anhydrides, amides, and esters. Esters are preferred derivatives. Preferably the esters are $\alpha,\beta$-ethylenically unsaturated carboxylic acid ester comonomers and include, but are not limited to, methyl acrylate, ethyl acrylate, isopropyl acrylate, butyl acrylate and combinations thereof.

The ethylene acid copolymers may be synthesized by any suitable polymerization process. For example, the ethylene acid copolymers may be polymerized as described in U.S. Pat. Nos. 3,404,134, 5,028,674, 6,500,888, and 6,518,365.

Preferably, the ethylene acid copolymer has a melt index (MI) of about 60 g/10 min or less, more preferably about 45 g/10 min or less, yet more preferably about 30 g/10 min or less, or yet more preferably about 25 g/10 min or less, or still more preferably about 10 g/10 min or less, as measured by ASTM method D1238 at 190° C. and 2.16 kg.

Some suitable ethylene acid copolymer resins are commercially available from DuPont, under the trademark NUCREL®.

To obtain the ionomers, at least a portion of the carboxylic acid moieties of the ethylene acid copolymers is neutralized to form carboxylate groups. Preferably about 5 to about 90%, more preferably about 10 to about 50%, yet more preferably about 20 to about 50%, or still more preferably about 20 to about 35% of the carboxylic acid groups are neutralized, based on the total carboxylic acid content of the ethylene acid copolymers. An example of a suitable procedure for neutralizing the ethylene acid copolymers is also described in U.S. Pat. No. 3,404,134.

The ionomers comprise cations as counterions to the carboxylate anions. Suitable cations include any positively charged species that is stable under the conditions in which the ionomer composition is synthesized, processed and used. Preferably, the cations are metal cations that may be monovalent, divalent, trivalent or multivalent. Combinations of two or more cations that may have different valencies, for example mixtures of Na+ and Zn2+ or mixtures of NH4+ and K+, are also suitable. The cations are more preferably monovalent or divalent metal ions. Still more preferably, the metal ions are selected from the group consisting of ions of sodium, lithium, magnesium, zinc, and potassium and combinations of two or more thereof Still more preferably, the metal ions are selected from the group consisting of ions of sodium, ions of zinc and combinations thereof Still more preferably, the metal ions comprise or consist essentially of sodium ions.

The ionomer preferably has a MI of about 10 g/10 min or less, more preferably about 5 g/10 min or less, or still more preferably about 3 g/10 min or less, about 1.0 g/10 min or less, about 0.5 g/10 min or less, about 0.2 g/10 min or less, or about 0.1 g/10 min or less, as measured by ASTM method D1238 at 190° C. and 2.16 kg. The ionomer also preferably has a flexural modulus greater than about 40,000 psi (276 MPa), more preferably greater than about 50,000 psi (345 MPa), or still more preferably greater than about 60,000 psi (414 MPa), as measured by ASTM method D790 (Procedure A).

Some suitable ionomeric resins are commercially available from DuPont, under the trademarks SURLYN® resins.

Suitable polyamides may be chosen from semi-aromatic, aliphatic polyamides, and blends thereof having a melting temperature of from 150 to 330° C.

The polyamide may be a fully aliphatic polyamide. Fully aliphatic polyamide resins may be formed from aliphatic and alicyclic monomers such as diamines, dicarboxylic acids, lactams, aminocarboxylic acids, and their reactive equivalents. A suitable aminocarboxylic acid includes 11-aminododecanoic acid. In the context of this invention, the term "fully aliphatic polyamide resin" also refers to copolymers derived from two or more such monomers and blends of two or more fully aliphatic polyamide resins. Linear, branched, and cyclic monomers may be used.

Carboxylic acid monomers comprised in fully aliphatic polyamide resins may include, but are not limited to, aliphatic carboxylic acids, such as for example adipic acid (C6), pimelic acid (C7), suberic acid (C8), azelaic acid (C9), sebacic acid (C10), dodecanedioic acid (C12) and tetradecanedioic acid (C14). Diamines can be chosen among diamines having four or more carbon atoms, including, but not limited to tetramethylene diamine, hexamethylene diamine, octamethylene diamine, decamethylene diamine, 2-methylpentamethylene diamine, 2-ethyltetramethylene diamine, 2-methyloctamethylene diamine; trimethylhexamethylene diamine and/or mixtures thereof. Suitable examples of fully aliphatic polyamide resins include PA6; PA6,6; PA4,6; PA6,10; PA6,12; PA6,14; P 6,13; PA 6,15; PA6,16; PA11; PA 12; PA10; PA 9,12; PA9,13; PA9,14; PA9,15; P 6,16; PA9,36; PA10,10; PA10,12; PA10,13; PA10,14; PA12, 10; PA12,12; PA12,13; 12,14 and copolymers and blends of the same.

Preferred examples of fully aliphatic polyamide resins described herein include PA6, PA11, PA12, PA4,6, PA6,6, PA,10; PA6,12; PA10,10 and copolymers and blends of the same.

The layer of protective polymer comprising a blend of ionomer and polyamide may have a thickness of from 50 to 500 µm, preferably of from 50 to 250 µm, and more preferably of from 100 to 200 µm.

In another embodiment a layer of protective polymer may comprise a polymer selected from the group consisting of grafted or non-grafted polypropylene homopolymer, grafted or non-grafted polypropylene copolymer, perfluoro ethylene-propylene, perfluoroalkoxy alkane, ethylene tetrafluoroethylene, ethylene acrylate rubber, and combinations of two or more thereof.

The grafted or non-grafted polypropylene and grafted or non-grafted copolymer of propylene may be obtained by grafting and/or copolymerizing the propylene polymers and/or monomers with organic functionalities including acid, anhydride and/or epoxide functionalities. Examples of the acids and anhydrides used to modify polypropylene are mono-, di- or polycarboxylic acids such as acrylic acid, methacrylic acid, maleic acid, maleic acid monoethylester, fumaric acid, fumaric acid, itaconic acid, crotonic acid, itaconic anhydride, maleic anhydride and substituted maleic anhydride, e.g. dimethyl maleic anhydride or citrotonic anhydride, nadic anhydride, nadic methyl anhydride, and tetrahydrophthalic anhydride, or combinations of two or more thereof, with maleic anhydride being preferred.

Preferred protective polymer layers comprise grafted polypropylene and grafted copolymer of propylene. Some suitable grafted polypropylene and grafted copolymer of propylene are commercially available from DuPont, under the trademarks BYNEL®.

The fluoropolymer FEP (fluorinated ethylene propylene copolymer) is generally a copolymer of tetrafluoroethylene and hexafluoropropylene. Usually, FEPs comprise from 87 weight percent to 94 weight percent of tetrafluoroethylene and from 6 weight percent to 13 weight percent of hexafluoropropylene, more preferably from 88 weight percent to 90 weight percent of tetrafluoroethylene and from 10 weight percent to 12 weight percent hexafluoropropylene, all based on the total weight of the FEP.

The fluoropolymer PFA (perfluoroalkoxy copolymer) is generally a copolymer of tetrafluoroethylene and a perfluoroalkylvinylether such as perfluoropropylvinylether, perfluoroethylvinylether or perfluoromethylvinylether. Usually, PFA comprises from 90 weight percent to 98 or 99 weight percent of tetrafluoroethylene and from 1 or 2 weight percent to 10 weight percent of perfluoropropylvinylether, perfluoroethylvinylether or perfluoromethylvinylether. More preferably from 92 weight percent to 97 weight percent of tetrafluoroethylene and from 3 weight percent to 8 weight percent of perfluoropropylvinylether, perfluoroethylvinylether or perfluoromethylvinylether, all based on the total weight of the PFA.

The fluoropolymer ETFE (ethylene tetrafluoroethylene copolymer) is generally a copolymer of ethylene and tetrafluoroethylene. Usually, ETFEs comprise from 15 weight percent to 25 weight percent of ethylene and from 75 weight percent to 85 weight percent of tetrafluoroethylene, more preferably from 15 weight percent to 20 weight percent of ethylene and from 80 weight percent to 85 weight percent of tetrafluoroethylene, based on the total weight of the ETFE.

AEM are curable composition of copolymers of ethylene and alkyl (meth)acrylate containing at least 45 weight percent of said alkyl (meth)acrylate.

The term "curable" denotes a material that may be cross-linked through a chemical reaction or irradiation.

AEM may contain at least 45 weight percent of the alkyl (meth)acrylate, preferably of from 45 to 70 weight percent, more preferably of from 55 to 65 weight percent, based on the total weight.

The alkyl (meth)acrylate of the curable composition may be chosen among methyl (meth)acrylate, ethyl (meth)acrylate and butyl (meth)acrylate, and is preferably methyl (meth)acrylate.

Ethylene Acrylate Rubbers or AEMs are commercially available from DuPont under the trademarks VAMAC®.

The curable composition may be cured by any suitable means or by a curing agent, such as, for example chemical additives or radiation.

The cables of the present invention can be used in several applications where thermal management is needed. While temperature management inside buildings is one of the most relevant applications, the PCM composition of the present invention may also be used in automotive applications (for example for latent heat batteries, thermal management of electrical batteries, ceiling and seats of vehicles); air filters in air ducts; air conditioners; transportation applications; food packaging (to keep food chilled or warm); medical packaging (for example organ or vaccine transportation); woven and nonwoven fabrics for garments, clothes and sport wear; footwear; tree wraps, hand grips (in tools, sporting goods and vehicles); bedding; carpets; wood composites; electric cables and plastic tubes for hot media including water.

A particularly preferred application is in latent heat batteries of cars where energy is stored in the cables of the present invention while the engine is in operation and where the cables are able to release the energy stored when necessary (for instance for start-up in cold environment or cold season). This energy release allows to reduce viscosity of lubricating oils and cooling fluids and ultimately leads to lower fuel consumption and reduced $CO^2$ emission.

EXAMPLES

Example 1

Encapsulated PCM Cable Encapsulated in PA6-Ionomer Coating

In a first step, a dry blend of 90 weight percent paraffin granules commercially available from Rubitherm under the trade name RUBITHERM®RT70 (melting point 70° C.) and 10 weight percent of granules of ethylene vinyl acetate EVA (with 40 weight percent vinyl acetate comonomer) was fed into a wire coating extrusion line and extruded at a temperature of 72° C. and at a thickness of 1.5 mm onto a 220 decitex KEVLAR® yarn (para-aramid yarn). The produced cable ended up with a diameter of around 3 mm.

In a second step, a melt blend of 60 weight percent PA6 and 40 weight percent ionomer (methacrylic acid copolymer neutralized with zinc) has been extruded at a temperature of 250° C. using another wire coating line in order to apply a coating of 100 µm onto the above 3 mm diameter cable. So the final encapsulated PCM cable ended up with a diameter of around 3.2 mm.

10 cm long samples were then cut from the above cable and sealed at the two ends at a temperature of 250° C. using an impulse sealing equipment ("Medseal 410/610 MSI" from the company Audion Elektro). These samples have then been exposed to:

Air at a temperature of 130° C. during 24 hours

A mix of 50% ethylene glycol (product "G12 plus plus" distributed by the company Volkswagen AG)+50% demineralized water at a temperature of 130° C. during 24 hours A lubricating oil for cars (product "ATF-SP4(M)" from the company Michang Oil) at a temperature of 130° C. during 24 hours.

Once the ageing period of 24 hours was over, samples have then carefully been checked and following observations could be made:

Damages on the samples aged in ethylene glycol

No damage or melting of the cable samples after ageing in hot air and lubricating oil No opening of the sealed edges after ageing in hot air and lubricating oil No exudation or loss of the PCM from the cable samples after ageing in hot air and lubricating oil.

These results are summarized in Table 1 showing that if the PA6-Ionomer blend is resistant to the paraffin PCM, is a good barrier to the paraffin PCM, is resistant to high temperatures up to 130° C. and is resistant to lubrication oil, it is not sufficiently resistant to ethylene glycol according to the automotive requirements.

TABLE 1

Ageing results after 24 hours ageing at 130° C.

| Ageing medium | Air | Ethylene glycol | Lubricating oil |
|---|---|---|---|
| Cable appearance | Perfect | Damaged | Perfect |
| Edge seal tightness | Tight | Opened | Tight |
| Weight loss due to exuded PCM | 0% | Not applicable since opened seals | 0% |

Example 2

Encapsulated PCM Cable Encapsulated in a Two Layer Coating Comprising PA6-Ionomer and Polypropylene 3.4 mm diameter encapsulated PCM cables have been produced in the same way as in example 1 but by replacing the 100 µm thick monolayer coating of PA6-Ionomer by a coextruded two layers coating comprising one 100 µm thick layer of the same melt blend of 60 weight percent PA6 plus 40 weight percent ionomer (towards the core PCM material) and a second 100 µm thick layer of non-grafted polypropylene homopolymer having a melting point of 165° C. (towards the outside).

10 cm long samples have also been cut from the above cable and sealed at the two ends at a temperature of 250° C. using an impulse sealing equipment ("Medseal 410/610 MSI" from the company Audion Elektro). These samples have then also been exposed to:

Air at a temperature of 130° C. during 24 hours

A mix of 50% ethylene glycol (product "G12 plus plus" distributed by the company Volkswagen AG)+50% demineralized water at a temperature of 130° C. during 24 hours A lubricating oil for cars (product "ATF-SP4(M)" from the company Michang Oil) at a temperature of 130° C. during 24 hours.

Once the ageing period of 24 hours was over, samples have then carefully been checked and following observations could be made:

No damage or melting of any of the cable samples (regardless of the embedding medium)

No opening of the sealed edges (regardless of the embedding medium)

No exudation or loss of the PCM from the cable samples (regardless of the embedding medium).

These results are summarized in Table 2 showing that the encapsulating coextruded coating comprising one layer of PA6-Ionomer blend and one layer of polypropylene is a good barrier to paraffin PCM and is resistant to paraffin PCM, to high temperatures up to 130° C., to lubrication oil and to ethylene glycol according to the automotive requirements.

TABLE 2

Ageing results after 24 hours ageing at 130° C.

| Ageing medium | Air | Ethylene glycol | Lubricating oil |
|---|---|---|---|
| Cable appearance | Perfect | Perfect | Perfect |
| Edge seal tightness | Tight | Tight | Tight |
| Weight loss due to exuded PCM | 0% | 0% | 0% |

What is claimed is:

1. A cable comprising a core and a phase change material (PCM) layer surrounding the core, wherein the PCM layer consists of a PCM composition; the PCM composition comprises a PCM and an ethylene copolymer; and the core consists of a yarn, strand, or wire; each of said yarn, strand and wire being made of a natural or synthetic polymeric material or a metal;

wherein the cable comprises two additional layers, wherein the first additional layer is made of a blend of ionomer and polyamide and the second additional layer is made of a polymer selected from the group consisting of grafted or non-grafted polypropylene homopolymer, grafted or non-grafted polypropylene copolymer, perfluoro ethylene-propylene copolymer, perfluoroalkoxy alkane copolymer, ethylene tetrafluoroethylene copolymer, ethylene acrylate rubber and combinations of two or more thereof.

2. The cable of claim 1, wherein the amount of ethylene copolymer in the PCM composition is less than or equal to 30 weight percent, based on the total weight of the PCM composition.

3. The cable of claim 1, wherein the ethylene copolymer is ethylene vinyl acetate.

4. The cable of claim 1, wherein the yarn, strand or wire is made of polyparaphenylene terephtalamide.

5. The cable of claim 1, wherein the two additional layer(s) have a thickness of between 50 and 600 µm.

6. The cable of claim 1, wherein the amount of PCM is at least 70 weight percent, based on the total weight of the cable.

7. The cable of claim 1, wherein the cable has a diameter of 3 to 6 mm.

8. A process for making the cable of claim 1, said process comprising the steps of:

providing the core;

extruding the PCM composition onto the core to form the cable; and extruding two layers of a protective polymer onto the PCM composition and the core, wherein the first layer is made of a blend of ionomer and polyamide and the second layer is made of a polymer selected from the group consisting of grafted or non-grafted polypropylene homopolymer, grafted or non-grafted polypropylene copolymer, perfluoro ethylene-propylene copolymer, perfluoroalkoxy alkane copolymer, ethylene tetrafluoroethylene copolymer, ethylene acrylate rubber, and combinations of two or more thereof.

9. The use of the cable of claim 1 in thermal management.

10. The use of the cable of claim 1 in the automotive industry.

11. The use of the cable of claim 1 in electrical and heat batteries.

* * * * *